United States Patent

[11] 3,620,475

[72] Inventor Edward Michael Penn
7 Rego Court, Huntington Station, N.Y. 11746

[21] Appl. No. 787,807
[22] Filed Dec. 30, 1968
[45] Patented Nov. 16, 1971

[54] DATA PROCESSING MAGNETIC TAPE CARTRIDGE
2 Claims, 5 Drawing Figs.

[52] U.S. Cl. .......... 242/197, 206/52 F, 242/71.1
[51] Int. Cl. .......... G11b 23/04
[50] Field of Search .......... 242/197, 198, 71.1, 71.8, 209; 206/52 F

[56] References Cited

UNITED STATES PATENTS

| | | | |
|---|---|---|---|
| 3,235,067 | 2/1966 | Hultgren | 206/52 F |
| 3,286,829 | 11/1966 | Lyman et al. | 206/52 F |
| 3,311,228 | 3/1967 | Kulka | 206/52 F |
| 3,343,667 | 9/1967 | Tellen | 206/52 |
| 3,371,882 | 3/1968 | Orlando et al. | 242/209 |
| 3,375,990 | 4/1968 | Hultgren | 242/71.1 X |
| 3,075,427 | 1/1963 | Salzmann | 242/198 X |
| 3,090,574 | 5/1963 | Doncaster et al. | 242/198 X |
| 3,275,256 | 9/1966 | Campbell, Jr. et al. | 242/197 |
| 3,307,688 | 3/1967 | Widmont, Jr. | 242/197 X |
| 3,401,898 | 9/1968 | Haberstroh | 242/197 |

FOREIGN PATENTS

| | | | |
|---|---|---|---|
| 846,930 | 9/1960 | Great Britain | 242/197 |

*Primary Examiner*—John Petrakes
*Attorney*—Edward H. Loveman

ABSTRACT: A disk-type case for a reel of magnetic tape is formed with two mating disk sections which may be snap fitted together. The sections have an unobstructed central aperture area in which the hub of a tape reel is exposed so that the reel may be rotated while in said casing. A peripheral slot having an adjustable closure is provided in the case for tape entry and exit. Frictionless gaskets in the sections of the case permit rotation of the reel while maintaining air seals at the central apertured area.

INVENTOR.
EDWARD MICHAEL PENN

DATA PROCESSING MAGNETIC TAPE CARTRIDGE

SUMMARY OF THE INVENTION

The invention is concerned with a case which is mounted on any conventional magnetic tape reel. To facilitate this mounting the case is formed in two half sections which snap together with a suitable snapping detent action. Surrounding the central area of the case is a frictionless gasket which permits rotation of the reel in the case while providing a central air seal for protecting the tape. A port is cut in the periphery of the case to allow tape entry and exit of the case. This port may be closed by a sliding plate which may also be used to clamp the tape leader of the tape whenever the case and tape reel are removed from a tape drive unit. To insure a good air seal, the end of the sliding clamp plate has a piece of gasket material secured to it.

This case has several advantages over those cases currently being used, namely:

1. Protects the reels of tape both in storage and when mounted on a tape drive unit;
2. Simplifies the operator procedures in data processing sites since no time is consumed in placing the tapes into and out of protecting cases; and
3. By sliming the case more storage space may be utilized compared to the current case protection systems, e.g., three-fourth inch thick as compared with the current cases of 1¼ inch thick. These and other advantages will be readily appreciated as the same becomes better understood by reference to the following detailed description when considered in connection with the accompanying drawings in which:

Figure 1:
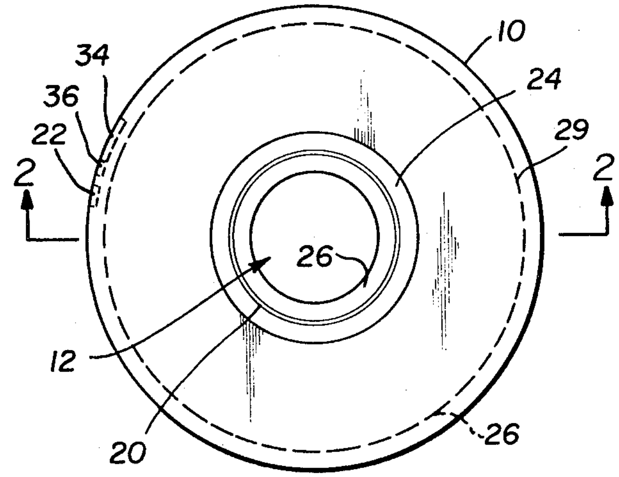
FIG. 1 is a top plan view of the case embodying the invention.
Figure 2:
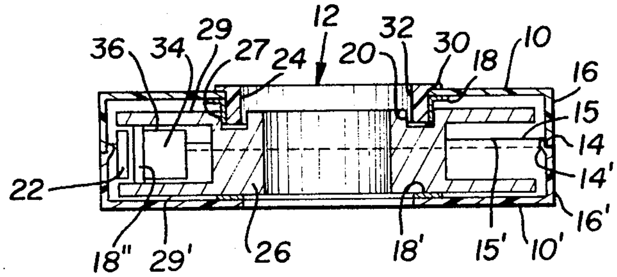
FIG. 2 is a cross section taken along line 2—2 of FIG. 1.
Figure 4:
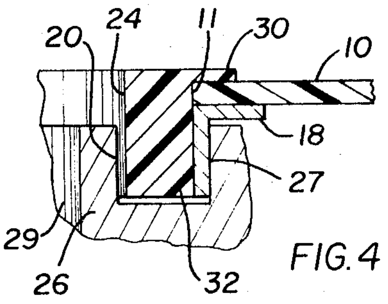
FIG. 4 is an enlarged fragmentation cross-sectional view of a central portion of the case as shown in FIG. 2.
Figure 3:
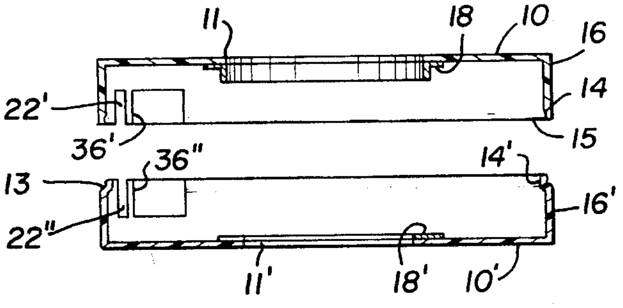
FIG. 3 is an exploded sectional view showing the two halves of the case separated.
Figure 5:
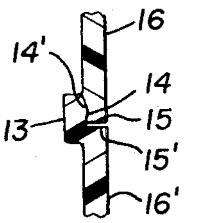
FIG. 5 is an enlarged fragmentation of a side portion of the case as shown in FIG. 2.

Referring, now to the drawings wherein like reference characters designate like or corresponding parts throughout, there is illustrated in FIGS. 1 through 5 a case comprising first and second mating disk sections 10 and 10' of equal diameter and each preferably made of plastic material. Each section 10, 10' has the shape of a shallow circular disk with a central unobstructed aperture, 11, 11'. The sections have registering peripheral skirts 16, 16'. As clearly illustrated in FIG. 5 the skirt 16 is formed with a circumferentially spaced external indentation 14 at rim 15 which engages a correspondingly formed protrusion 14' on a radially inwardly projecting wall portion 13 at rim 15' in a snap fit, so that the disk sections are held detachably in abutment and registration with each other. The aligned apertures 11, 11' define a central area 12 in which is exposed the axial cylindrical hub 26 of a tape reel 29. This hub may be engaged by an external tape drive unit or mechanism (not shown) for rotating the reel while it is in the case. An annular gasket 18 is made of a frictionless material such as a plastic, and is bonded to the rim of aperture 11, and extends axially inwardly of the case and is adapted to fit into an annular slot or groove 20 of the hub 26. This gasket fits snugly against an outer side 27 of the groove 20 to form an airtight, dustproof seal without preventing rotation of the reel 29. A flat ring gasket 18' also made of a smooth frictionless material such as a plastic is bonded to the inside of section 10' at the rim of aperture 11'. The gasket 18' forms an airtight seal with the bottom wall 29' of the reel 29, without preventing rotation of the reel. A protective ring 24 may be inserted through aperture 11 and has an annular lip 30 bearing on the top of section 10 and a skirt 32 fitted in the groove 20 of the reel and in juxtaposition to the gasket 18. By the arrangement described, the reel is freely rotatable within the case while gaskets 18 and 18' provide air seals protecting the tape (not shown) wound on the reel 29.

A port or slot 22 is defined by registering notches 22' and 22'' in respective skirts 16 and 16'. Port 22 permits passage of tape into and out of the case when the reel is rotated in the case. A small rectangular plate 34 is slidably engaged in a recess 36 having two sections 36' and 36'' inside the case. This plate may be moved circumferentially of the case to close port 22. A strip of gasket material 18'' is secured on the end of the plate adjacent port 22 to help seal the port. This plate and gasket strip may, of course, serve as a clamp for the tape leader at the port.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A case for rotably enclosing a reel of magnetic tape comprising,
   - a first and a second disk section of equal diameter, each of said sections having a central aperture and a peripheral cylindrical skirt, said skirts being disposed in abutment and registration to axially align said central apertures,
   - said section skirts being formed with integrally mutually engaging snap fitting fastener means for holding said first and second sections together and said skirts having aligned notches defining a peripheral slot through which a tape may pass when said reel is rotated in said case, and
   - frictionless gaskets at the rims of said central apertures respectively for engaging said reel and providing air seals thereat while permitting rotation of said reel in said case, one of said apertures having a diameter sufficiently large whereby a central hub on said reel is exposed and may be engaged by a drive mechanism to rotate said reel while it is in said case.

2. A case as recited in claim 1, further comprising a slidable closure member mounted inside said abutted skirts of said sections for adjustably closing said slot and for engaging a leader of said tape thereat.

* * * * *